US012717212B2

(12) United States Patent
Lee

(10) Patent No.: US 12,717,212 B2
(45) Date of Patent: Aug. 25, 2026

(54) PHOTONIC DEVICES AND METHODS

(71) Applicant: Eyal Terkieltaub Lee, Rosh Haayn (IL)

(72) Inventor: Eyal Terkieltaub Lee, Rosh Haayn (IL)

( * ) Notice: Subject to any disclaimer, the term of this patent is extended or adjusted under 35 U.S.C. 154(b) by 497 days.

(21) Appl. No.: 18/317,648

(22) Filed: May 15, 2023

(65) Prior Publication Data

US 2024/0160083 A1 May 16, 2024

Related U.S. Application Data

(60) Provisional application No. 63/425,480, filed on Nov. 15, 2022.

(51) Int. Cl.
*G02F 3/00* (2006.01)

(52) U.S. Cl.
CPC .................................... *G02F 3/00* (2013.01)

(58) Field of Classification Search
CPC .. G02F 3/00–028; G02F 1/3523; G02F 1/365; G02F 1/3515; H01S 5/0265; H01S 5/026; H01S 3/1118; B82Y 20/00; G02B 1/005
USPC ................................................ 359/107, 108
See application file for complete search history.

(56) References Cited

U.S. PATENT DOCUMENTS 3,617,779 A * 11/1971 Rosenberg ............... G02F 3/00 359/241
5,144,375 A 9/1992 Gabriel et al.
5,987,040 A 11/1999 Nesset et al.
6,005,994 A 12/1999 Macdonald et al.
6,522,462 B2 2/2003 Chu et al.
6,571,028 B1 * 5/2003 LoCascio .............. B82Y 10/00 385/5
7,005,669 B1 * 2/2006 Lee ....................... B82Y 20/00 257/17
7,903,445 B2 3/2011 Song et al.
(Continued)

FOREIGN PATENT DOCUMENTS

JP 6167732 B2 7/2017

OTHER PUBLICATIONS

U.S. Appl. No. 63/425,480, filed Nov. 15, 2022.
(Continued)

*Primary Examiner* — Stephone B Allen
*Assistant Examiner* — Adam W Booher
(74) *Attorney, Agent, or Firm* — Ballard Spahr LLP

(57) ABSTRACT

A photonic device which includes input waveguides for receiving respective input optical signals, output waveguides for emitting respective output optical signals, and an element which interacts with the input optical signals for generating the output optical signals. The element interacts with the input optical signals dependent on the intensity range, and is either a saturable absorber or a reverse saturable absorber. The photonic device may be a part of a photonic chip operable in accordance with optical signals transmitted through waveguides, but not affected by external light conditions. Typically, the device comprises two input waveguide channels which unite at a Y-junction to form an output waveguide, and the device serves as a logical gate, AND, OR and XOR, for example. Other device configurations provide a memory cell, a transistor, an amplifier, and a high-power pass filter.

19 Claims, 6 Drawing Sheets

(56) References Cited

U.S. PATENT DOCUMENTS

| | | | | |
|---|---|---|---|---|
| 8,345,335 | B2 | 1/2013 | Nazarathy et al. | |
| 2004/0085828 | A1 * | 5/2004 | Kim .......................... | G02F 3/00<br>365/200 |
| 2015/0346580 | A1 * | 12/2015 | Williams ................ | G02F 1/353<br>977/783 |

OTHER PUBLICATIONS

Chen, et al., "Study of Nonlinear Plasmonic Scattering in Metallic Nanoparticles", American Chemical Society Photonics, vol. 3, Aug. 8, 2016, pp. 1432-1439.

Chu, et al., "Saturation and Reverse Saturation of Scattering in a Single Plasmonic Nanoparticle", American Chemical Society Photonics, vol. 1, Nov. 12, 2013, pp. 32-37.

* cited by examiner 185
130
135
145
175
170
165
160
150
180-RSA
140

75
80
M
100
85
110

75
80
M
100
85
110

75
80
200
M
110
100
85

75
80
210
M
100
85
110

75
215
100
80
M
85
110

75
80
M
100
85
110

PHOTONIC DEVICES AND METHODS

TECHNOLOGICAL FIELD

The present disclosure relates to photonic devices, and especially to photonic devices based on saturable absorption and reverse saturation absorption.

BACKGROUND

Integrated Photonic Circuits have attracted interest as they may process larger data sets faster than electric circuits. U.S. Pat. No. 5,144,375 discloses an optical gate based on a Sagnac loop that includes a Non-linear Element excited by an optical pump signal to generate a phase shift. U.S. Pat. No. 5,987,040 discloses an optical AND gate based on Four-wave mixing and which incorporates a pump signal to generate dynamic grating.

U.S. Pat. No. 6,005,994 discloses an optical AND gate where two pumping lasers change the absorption of a fiber using saturated absorption to control the propagation of a certain optical beam. The certain optical beam has a beam power which is lower than the power of the two pumping beams by several orders of magnitude. In addition, the wavelength of the pumping beams is in a band, around 0.98 μm, different from the wavelength of the controlled beam, which is around 1.5 μm. The use of pumping signals at much higher power than the controlled optical signal, and at an entirely different wavelength band makes the optical gates costly, complicated, slower, power-consuming, and hard to miniaturize. Also, the pumping lasers are made from different materials than those used in the semiconductor industry, and thus their integration in an optical chip is challenging. In addition, the power consumed by the pumping lasers limits miniaturization of the gates since it requires the use of heat dissipation techniques.

High power pumping, greater than 65 kWatt, is also used in Japanese patent JP6167732.

U.S. Pat. No. 7,903,445 B2 discloses a photonic memory device which includes a ring resonator, a method of storing data using the photonic memory device, and a photonic sensor device.

Saturable Absorbers (SA) and Reverse Saturable Absorbers (RSA) are used for applications such as chemical reactions, spectroscopy, and pulsed lasers. Recently, a new interest has risen in SA and RSA in the field of super-resolution microscopy.

Nanoparticles are used to achieve SA and RSA. Chu et al (ACS Photonics 2014, Vol. 1, pages 32-37), and Chen et al (ACS Photonics 2016, Vol. 3, pages 1432-1439) report the reaction of metal nanoparticles to intense light. They demonstrated that nanoparticles experience both saturated absorption and reverse saturated absorption in dependence on the power level of the incident optical beam. The intensities recorded for the SA phenomena were $10^5$ Watt/$cm^2$ and were dependent on the size of the nanoparticle. Thus, such nanoparticles inside a waveguide structure facilitate saturable absorption and reverse saturated absorption. Sometimes, a material demonstrates saturable absorption in a first intensity range, and reverse saturable absorption in a second intensity range. The current disclosure uses both SA and RSA in optical devices.

GENERAL DESCRIPTION

According to an aspect of the disclosure, a photonic device is provided. The device comprises a waveguide structure which includes input waveguides for receiving respective input optical signals, output waveguides for emitting respective output optical signals, and an element which interacts with the input optical signals for generating the output optical signals. The output optical signals are selected functions of the input optical signals. The element interacts with the input optical signals in accordance with a first attenuation rate for optical signals of a first (lower) intensity range and with a second attenuation rate for optical signals of a second (higher) intensity range. Typically, the at least one element may be placed at a selected location relative to a junction between one or more input waveguides and one or more output waveguides.

Generally, total optical intensity impinging the element is smaller than twenty times maximal intensity of any one of the respective input optical signals. Additionally, or alternatively, the photonic device may be operable utilizing input optical illumination transmitted through the one or more input waveguides. Accordingly, the photonic device may be fully operable in dark environments using no external illumination other than input signals transmitted via the input waveguides.

This configuration enables operation of a photonic chip/circuit comprising a plurality of photonic devices. The plurality of photonic devices comprises photonic devices operable in accordance with optical signals transmitted through waveguides of the photonic circuit. Accordingly, the photonic devices are generally configured to operate on and in accordance with input signals received via the one or more waveguides of the photonic circuit. While operation of the photonic device may be affected by external light conditions, the photonic device is designed for processing input signals, and effects of external light conditions are preferably minimized.

In some embodiments, the one element comprises a saturable absorber having a first attenuation range higher than a second attenuation range.

In some embodiments, the one element comprises a reverse saturable absorber having a first attenuation range lower than a second attenuation range.

An optical intensity of a pulsed optical signal may be a maximal power value or an energy value thereof.

In some embodiments, the one element is located at a selected distance from a junction between the input waveguides and the output waveguides. The selected distance may be determined in accordance with effective dimension of a photonic circuit. For example, the at least one element may be placed up to 100 nm, up to 200 nm, or up to 500 nm upstream or downstream of the junction with respect to direction of signal propagation. In some other examples, the at least one element may be placed at a distance between 500 nm and 1 micrometer from the junction. In some examples, the at least one element may be placed at a distance greater than 1 micrometer from the junction.

In some embodiments, the one element is embedded within a waveguide portion of the waveguide structure.

In some embodiments, the one element is positioned in external contact with a portion of the waveguide structure.

In some embodiments, the one element is positioned in proximity to a portion of the waveguide structure.

In some embodiments, the device comprises two or more output waveguide channels for emitting respective output optical signals.

In some embodiments, the device comprises at least two input waveguide channels for receiving at least two respective input optical signals. Preferably, two input waveguides unite at a Y-junction having a single output waveguide, or at a X-junction having two output waveguides. In some embodiments the one element is located on top of a wave-guiding surface of the Y-junction or X-junction. In some embodiments, sais at least one element may be located at a selected distance of said Y-junction or X-junction, being external to the waveguide structure of the junction.

In some embodiments, the device further comprises an attenuating component for attenuating an optical signal by a certain rate.

In some embodiments, the one element comprises one or more metals, one or more semiconductors, or a combination thereof, having characteristics of a saturable absorber, reverse saturable absorber, or combination. More specifically, the at least one element comprises one or more materials having an absorption loss with respect to light of selected wavelength range, such that light absorption is reduced at high optical intensities (SA). Alternatively, or additionally, the at least one element comprises material having absorption increased at high optical intensities (RSA).

In some embodiments, the one element comprises at least one of Au, Ag, Ti, Cu, Sn, Pt, Ge, and Cr.

In some embodiments, the one element comprises at least one of the semiconductors: GaAs, AlAs, Ge, TiN, and InP. In some embodiments, a structure of the one element comprises layers, sections, quantum dots, doped materials, or a combination thereof.

In some embodiments, total optical intensity impinging on the one element is smaller than twenty times maximal intensity of any one of the input optical signals.

In some embodiments, the device has a first and a second input waveguide and a single output waveguide. The first input waveguide guides the respective incoming optical signal to impinge the one element, but to substantially refrain from propagating into the single output waveguide.

In some embodiments, wavelengths of the input optical signals are in a certain wavelength band. For example, the input and/or output optical signals may be within a wavelength band typical for optical processing and/or optical communication. For example, the input and/or output optical signals may be within a wavelength range between 0.55 μm and 0.65 μm, or in a range between 1.25 μm and 1.65 μm. Generally, the photonic device is configured to operate processing on input and/or output signal of the selected wavelength range, such that optical irradiance outside the selected wavelength range does not take part in processing in the meaning that ON and OFF states on output signals are not determined by external signals that are outside of the selected wavelength range and/or propagate outside of the input waveguides. Preferably, the certain wavelength band is between 1.25 μm and 1.65 μm.

In some embodiments, the photonic device may be operable as operable as AND, OR, XOR or NOT logic gate. In some embodiments, the photonic device may be operable as a storage unit for storing binary data pieces.

According to an aspect of the disclosure, a method for operating a photonic device is provided. The method comprises providing input optical signals to respective input waveguide channels, interacting by one element with the input optical signals for generating output optical signals, and receiving the output optical signals from respective output waveguide channels. The output optical signals are selected functions of the input optical signals. The one element interacts with the input optical signals in accordance with a first attenuation rate for optical signals of a low intensity range, and with a second attenuation rate for optical signals of a high intensity range. Total optical intensity impinging the one element is smaller than twenty times maximal intensity of any one of the input optical signals.

In some embodiments, the one element is a saturable absorber having a first attenuation range higher than a second attenuation range.

In some embodiments, the one element is a reverse saturable absorber having a first attenuation range lower than a second attenuation range.

In some embodiments, the photonic device comprises at least two input waveguide channels, and the method includes providing the at least two input waveguide channels with at least two respective input optical signals.

In some embodiments, the output optical signal is a logical function of the input optical signals, like AND, OR, and XOR logical functions. Preferably, the photonic device comprises several input waveguides, a saturable absorber, and one output waveguide. The device provides an output optical signal compatible with a logical AND function of the input optical signals. Alternatively, the photonic device comprises two input waveguides, a reverse saturable absorber, and one output waveguide. The device provides an output optical signal compatible with either a logical OR or a logical XOR function of the input optical signals.

In some embodiments, the photonic device also comprises an attenuating component, and the method includes a step of attenuating an optical signal by a certain rate.

In some embodiments, the device comprises a first and a second input waveguide, a single output waveguide, and a saturable absorber element. The first input waveguide guides the respective input optical signal to pump the at least one element, but to substantially refrain from propagating into the single output waveguide. The method includes a step of providing the first and second input waveguides with respective first and second input optical signals for operating the device as a memory cell or as a transistor.

In some embodiments, the photonic device comprises two input waveguides, a saturable absorber, and one output waveguide, and the method includes operating the photonic device as an amplifier.

In some embodiments, the photonic device comprises one input waveguide, a saturable absorber, and one output waveguide, and the method includes operating the photonic device as a high-power pass filter.

According to an aspect of the disclosure, a photonic device based on reverse saturation absorption is provided. The photonic device comprises a waveguide structure which includes input waveguides for receiving respective input optical signals, output waveguides for emitting respective output optical signals, and a reverse saturable absorber which interacts with the input optical signals for generating the output optical signals. The output optical signals are selected functions of the input optical signals.

According to a further aspect, the present disclosure provides a photonic device comprising:

a waveguide structure comprising at least one input waveguide for receiving at least one respective input optical signal, and at least one output waveguide for emitting at least one respective output optical signal;

at least one element interacting with said at least one input optical signal for generating said at least one output optical signal, said at least one output optical signal being a selected function of said at least one input optical signal;

wherein said at least one element interacting with said at least one input optical signal in accordance with a first attenuation rate for optical signals of a first intensity range and with a second attenuation rate for optical signals of a second intensity range, where the second intensity range is higher than the first intensity range; and wherein the photonic device operating utilizing optical power transmitted through said at least one input waveguide.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
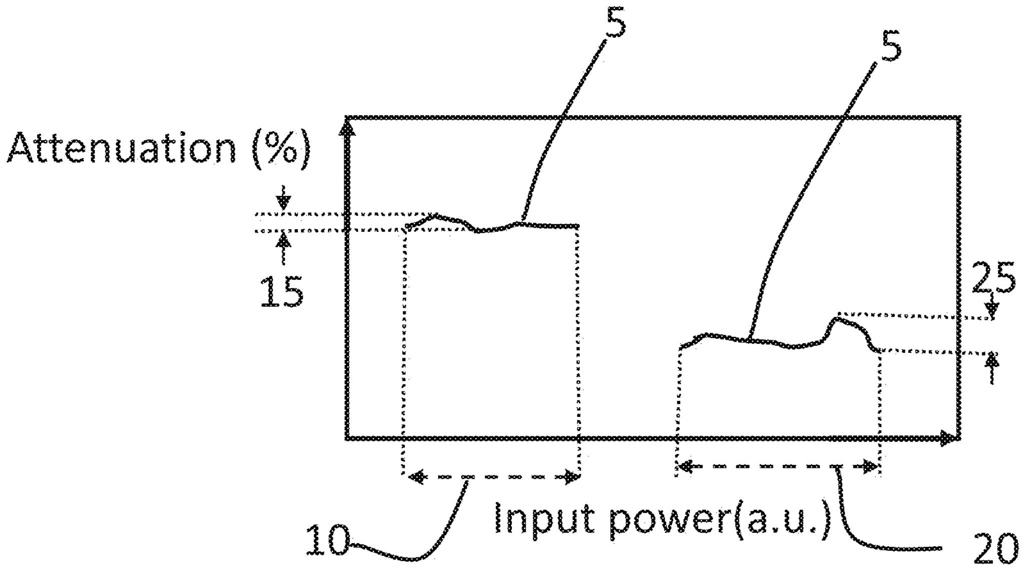
FIG. 1A illustrates attenuation versus input power for a saturable absorber.
Figure 1B:
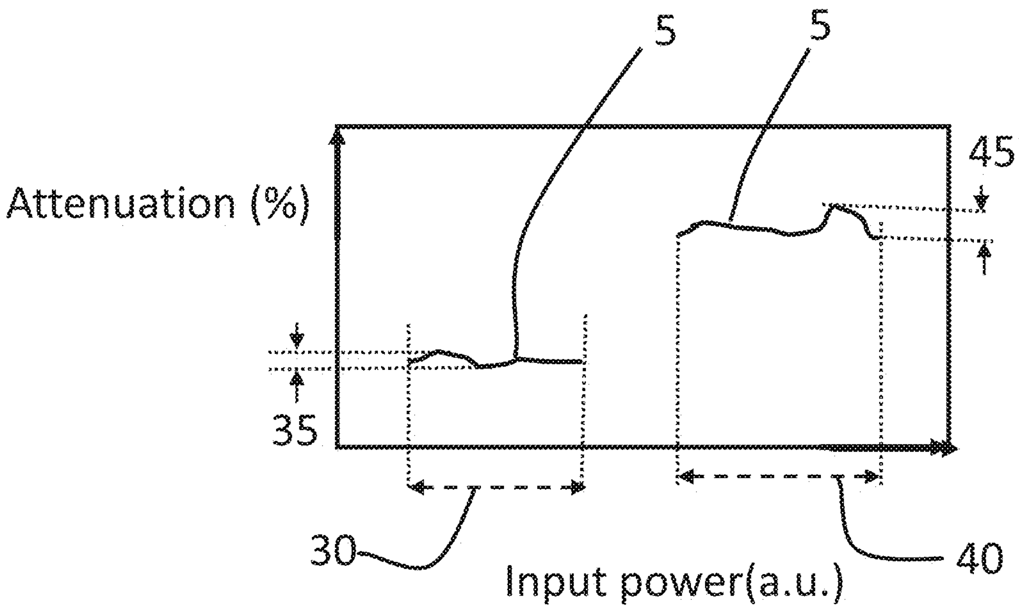
FIG. 1B illustrates attenuation versus input power for a reverse saturable absorber.

It is to be understood that the present disclosure is not limited to the disclosed example embodiments. It should also be understood that not every feature of the methods and systems handling the system is necessary to implement the present disclosure as claimed in any particular claim of the appended claims. Various elements and features of devices are described to fully enable the present disclosure. It should also be understood that throughout this disclosure, where a method is shown or described, the steps of the method may be performed in any order or simultaneously, unless it is clear from the context that one step depends on another being performed first. In addition, a step may be repeated several times.

Before explaining several embodiments of the present disclosure in detail, it is to be understood that the present disclosure is not limited in its application to the details of construction and the arrangement of the components set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this present disclosure belongs. The systems, methods, and examples provided herein are illustrative only and are not intended to be limiting.

In the description and claims of the present application, each of the verbs "comprise", "include" and "have", and conjugates thereof, are used to indicate that the object or objects of the verb are not necessarily a complete listing of members, components, elements, or parts of the subject or subjects of the verb.

The current disclosure deals with photonic devices that include special elements and process optical signals. A first special element is a saturable absorber which attenuates an optical signal carried by an optical beam that propagates through the element. Attenuation 5 depends on the intensity of the optical signal as shown in FIG. 1A. For a low intensity range 10 the attenuation range 15 is relatively high. For a high intensity range 20 the attenuation range 25 is relatively low. Thus, relatively, the saturable absorber delivers high intensity optical signal better than it delivers a low intensity optical signal.

It is noted that the attenuation determines the intensity of the optical signal after the special element relative to its intensity before it propagates through the special element. Usually, attenuation is caused mainly by absorption, and to a lesser extent by scattering or reflection.

A second special element is a reverse saturable absorber which also attenuates a propagating optical signal. Again, attenuation 5 depends on the intensity of the optical signal as shown in FIG. 13. For a low intensity range 30, the attenuation range 35 is relatively low. For a high intensity range 40 the attenuation range 45 is relatively high. Thus, relatively, the reverse saturable absorber delivers a high intensity optical signal in a poorer manner than it delivers a low intensity optical signal.

Figure 2:
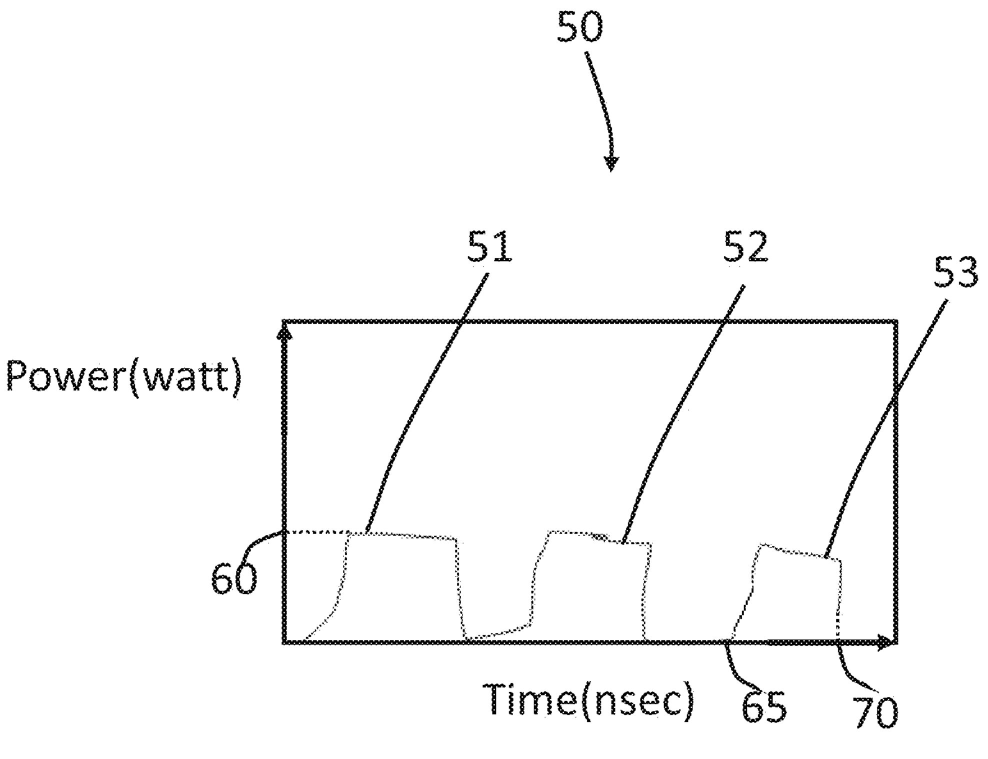
FIG. 2 illustrates a typical series of pulsed optical signals having a maximal power and a total energy.

Throughout the current document, an optical intensity of a pulsed optical signal is either a maximal power value, or an energy value thereof, as shown in FIG. 2, which presents a typical series 50 of pulsed optical signals, 51, 52, and 53. Pulsed optical signal 51, for example, has a maximal power value 60, which typically may be in the range of 1 nWatt to 1 mWatt. Pulsed optical signal 53, for example, has a total energy obtainable by integrating the power between pulse start time 65 and pulse end time 70.

The optical signals propagating in the waveguides may be a CW (Continuous Wave) or pulsed signals. The wavelength of the optical signals is between 0.5 urn to 5 μm. Preferably, the wavelength of the optical signals is between 1.25 μm to 1.65 μm. Most preferably, the wavelength of the optical signals is between 1.25 urn to 1.35 μm (0 band) or between 1.525 μm to 1.565 μm (C band). The power of the input optical signals may be between 10 Watt/$cm^2$ and $10^7$ Watt/$cm^2$.

Figures 3, 4:
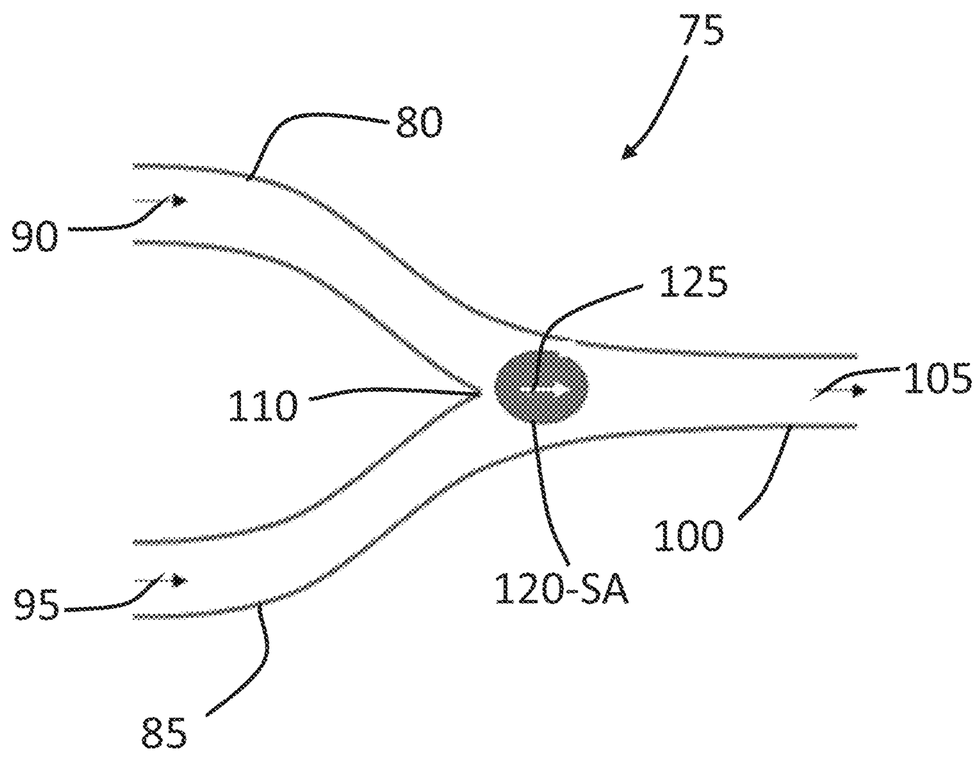
FIG. 3 illustrates a Y-junction device with a saturable absorber nearby the junction.
FIG. 4 illustrates a Y-junction device with a reverse saturable absorber nearby the junction, and an additional attenuating component in an input waveguide.

A photonic device 75 is illustrated in FIG. 3. The device includes input waveguides 80 and 85 which receive respective input optical signals 90 and 95, and output waveguide 100 for emitting respective output optical signal 105. The two input waveguides 90 and 95 unite at a Y-junction 110 to the output waveguide 100. A special element, saturable absorber 120-5A, is located near the Y-junction 110. The two optical signals 90 and 95 unite to form a combined optical signal or optical beam 125 which propagates through saturable absorber 120-5A. The saturable absorber absorbs and attenuates the combined optical signal 125 for generating the output optical signal 105. To be more specific, the saturable absorber attenuates the combined optical signal 125 by an attenuation rate of the first attenuation range 15 for a combined optical signal of a low intensity range 10, and attenuates the combined beam 125 by an attenuation rate of the second attenuation range 25 for a combined optical signal 125 of a high intensity range 20.

Generally, the optical intensity interacting with the saturable absorber 120-5A propagates through the input optical signals 90 and 95. Accordingly, the photonic device 75 operates without any external control other than the input signals 90 and 95 propagating though input waveguides 80 and 85.

Additionally, total optical intensity impinging the saturable absorber 120-5A is smaller than twenty times maximal intensity of any one of the input optical signals 90 and 95. In an optical chip which may contain the photonic device, the saturable absorber 120-5A or any other special element, is typically not affected by external light conditions.

The output optical signal 105 is a logical AND function of the input optical signals 90 and 95, as follows. In a first case, input signal 90 is in the intensity range 10 (logical 1) while input signal 95 is zero (logical 0). The high attenuation range 15 applies and the output signal 105 is below a threshold intensity and constitutes a logical 0. In a second case, both input signals 90 and 95 are in the intensity range 10 (both logical 1), but the combined signal 125 is in the intensity range 20 and thus is attenuated only a low attenuation rate of the attenuation range 25. Consequently, the output signal 105 is above a threshold intensity and constitutes a logical 1. In other words, the photonic device 75 provides a logical function AND. An attenuating element 185, shown in FIG. 4, may be added to any of the input or output waveguides, for intensity tuning or calibration.

Another photonic device 130, illustrated in FIG. 4, provides other logical functions, OR and XOR, for example. The device includes input waveguides 135 and 140 which receive respective input optical signals 145 and 150, and output waveguide 160 for emitting respective output optical signal 165. The two input waveguides 135 and 140 unite at a Y-junction 170 to form a combined optical signal 175. A special element, reverse saturable absorber 180-RSA is located nearby Y-junction 170 such that the combined optical signal 175 propagates through reverse saturable absorber 180-RSA which attenuates it for generating the output optical signal 165. The reverse saturable absorber 180-RSA attenuates the combined optical signal 175 by an attenuation rate of the first attenuation range 35 for a combined optical signal of a low intensity range 30, and attenuates the combined optical signal 175 by an attenuation rate of the second attenuation rate 45 for a combined optical signal 175 of a high intensity range 40.

The output optical signal 165 of the RSA photonic device is a selected function of the input optical signals, OR and XOR, dependent on the parameters of the RSA element 180-RSA and on the intensity of the optical signal 175. OR function is discussed in the current example, and XOR function is discussed in a next example. In a first case of the OR example, input signal 145 is in the intensity range 30 (logical 1) while input signal 150 is below a threshold, and fits a logical 0. An attenuation rate of the low attenuation range 35 applies and the output signal 165 is above a threshold intensity and constitutes a logical 1. In a second case, both input signals 145 and 150 are in the intensity range (both logical 1), but the combined signal 175 is in the intensity range 40 and thus is attenuated by an attenuation rate of the high attenuation range 45. Yet, the output signal 165 is above a threshold intensity and constitutes a logical 1. In other words, the photonic device 130 provides a logical function OR.

Referring now to a XOR device 130, in a first case, input signal 145 is in the intensity range 30 (logical 1) while input signal 150 is below a threshold, and fits a logical 0. An attenuation rate of the low attenuation range 35 applies and the output signal 165 is above a threshold intensity and constitutes a logical 1. In a second case, both input signals 145 and 150 are in the intensity range 30 (both logical 1), but the combined signal 175 is in the intensity range 40 and thus is attenuated by an attenuation rate of the high attenuation range 45. The attenuation range 45 for the XOR device 130 is designed to be high enough such that the output signal 165 is below a threshold intensity and constitutes a logical 0. In other words, the photonic device 130 provides a logical function XOR.

In some embodiments, a photonic device such as 130 further comprises an attenuating component 185 for attenuating an input optical signal 145 by a certain rate. The attenuation device 185 provides tunability of the optical intensity to provide a desired function of the photonic device. An attenuating component 185 may be located in any waveguide of a photonic device to provide a desired intensity tuning or calibration for obtaining a desired function. The attenuation device 185 may be placed at one or more of the input waveguides, prior to junction 170 to tune the input signal to selected intensity. Alternatively, and in some embodiments, preferably, the attenuation device 185 may be placed at an output waveguide (e.g., 160) to adjust output intensity to system requirements.

In some embodiments, wavelengths of the input optical signals are in a certain wavelength band, and no irradiance outside the certain wavelength band impinges the at least one element 180. Preferably, the certain wavelength band is 1.25-1.35 μm or 1.5-1.6 μm.

Regarding a location of a special element M, 120-5A or 180-115A, in a photonic device, reference is made to FIGS. 5A, 5B, 5C, 5D, 5E, and 5F. For convenience, the components of a Y-junction are those of FIG. 3, but in their entirety apply to the device of FIG. 4 as well. It is also noted that the Y-junction defines a plane, and, for the sake of discussion only, to fit the drawings and without any physical significance, the plane is referred to as a horizontal plane facing earth on its bottom side. Thus, a bottom part of a junction is a part facing Earth, and opposing an upper part of the junction. Also, a Y-junction is designated by a number that relates both to the junction as a whole, and to a specific point in the scheme, where the relevant meaning is clear from the context.

Figures 5A, 5B, 5C, 5D, 5E, 5F:
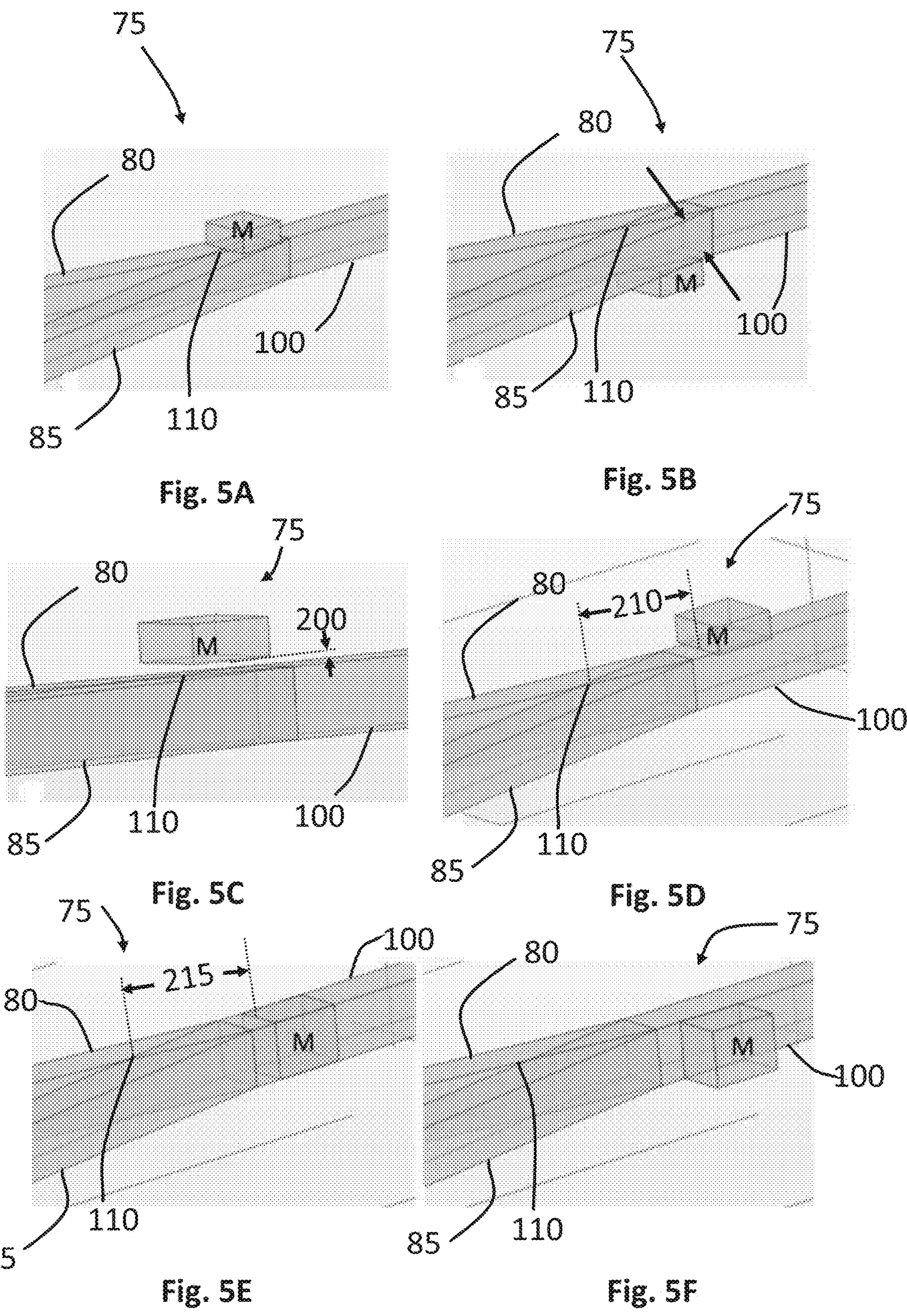
FIG. 5A illustrates a Y-junction device with an element located above the junction and interacting with a guided optical signal.
FIG. 5B illustrates a Y-junction device with an element located below the junction.
FIG. 5C illustrates a Y-junction device with an element located above the junction at a certain distance.
FIG. 5D illustrates a Y-junction device with an element located above the output waveguide.
FIG. 5E illustrates a Y-junction device with an element located within the output waveguide.
FIG. 5F illustrates a Y-junction device with an element located nearby the output waveguide.

In FIG. 5A, the special element M is touching the upper part of the junction 110, and interacts with a guided optical signal propagating therein.

In FIG. 5B, the special element M is touching the bottom part of the junction 110 and interacts with a guided optical signal propagating therein.

In FIG. 5C, the special element M is located at some distance 200 above the Y-junction 110. The distance 200 is small enough for interaction of the special element M with the optical signal guided therein. In one embodiment, the distance 200 is below 1000 nm, below 500 nm, or below 100 nm.

In FIG. 5D, the special element M is touching the upper part of waveguide 100 at some distance 210 from the Y-junction 110. In one embodiment, the distance 210 is below 2000 nm, below 1000 nm, below 500 nm, or below 100 nm. In another embodiment, the distance 210 is smaller than the distance between the current device and the next one.

In FIG. 5E, the special element M is embedded within output waveguide 100 at Y-junction 110 or at a distance 215 from Y-junction 110. In one embodiment, the distance 215 is below 2000 nm, below 1000 nm, below 500 nm, or below 100 nm. In another embodiment, the distance 215 is smaller than the distance between the current device and the next one.

In FIG. 5F, the special element M is touching a side of the output waveguide 100.

Figure 6:
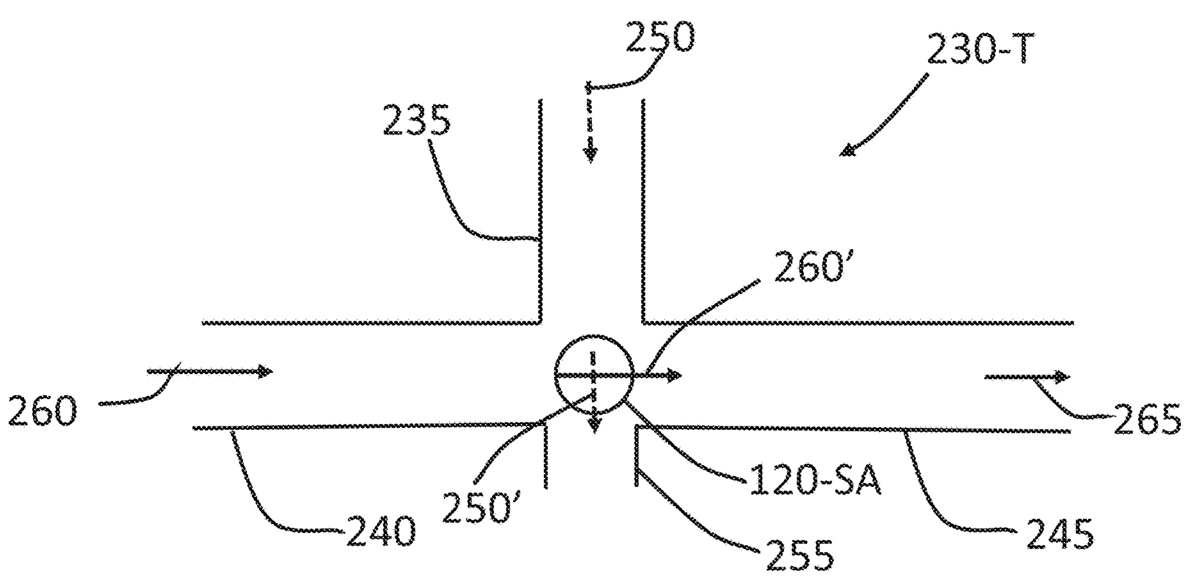
FIG. 6 illustrates a T-junction device with a saturable absorber for use as a memory or as a transistor.

Referring now to FIG. 6, a waveguide junction device 230-T is shown. The device 230-T includes a first input waveguide 235, a second input waveguide 240, an output waveguide 245, and a saturable absorber 120-5A located at the junction. The first input waveguide 235 guides a respective input optical signal 250 to impinge the saturable absorber 120-5A and refrain from propagating into the output waveguide 245. Optical signal 250 may be fully absorbed by saturable absorber 120-5A, or the signal 250' may be directed to output waste waveguide 255 when used. The second input waveguide 240 guides an optical signal 260 towards the saturable absorber 120-5A which attenuates it to an optical signal 260', which is emitted from output waveguide 245 as output optical signal 265. It should be noted that the example of FIG. 6 illustrates an X junction including output waveguides 245 and 265. In some configurations, output 265 may be omitted, leaving the device in a T-junction configuration.

Generally, as indicated above, the device 230-T is configured to be operable by input signals 250 and 260 transmitted through input waveguides 235 and 240, and may be passive in terms of use of external signals controlling operation thereof.

Usually, the total optical intensity impinging the saturable absorber 120-5A, the sum of the optical intensities of optical signal 250 and optical signal 260, is smaller than twenty times maximal intensity of optical signal 260 or of optical signal 250. Preferably, the total optical intensity impinging the saturable absorber 120-5A is smaller than three times maximal intensity of optical signal 260 or of optical signal 250. There is no optical signal that impinges the saturable absorber 120-5A without being guided by any of the waveguides 235, 240, 255, and 245.

The photonic device 230-T serves as a memory cell, as follows. In a first case, optical signal 250 is launched to the saturable absorber 120-5A at a write level which saturates it, where being saturated constitutes the 1 state. Reading is achieved by launching a high (1) optical signal as optical signal 260. As the saturable absorber 120-SA is saturated, attenuated optical signal 260' is still above a threshold, and is read as 1 at output optical signal 265. In a second case, no optical signal 250 is launched, and therefore the saturable absorber 120-5A is unsaturated, or in the 0 state. A high reading optical signal 260 is severely attenuated and thus output optical signal 265 is below a threshold and interpreted as a 0 reading. Thus, photonic device 230-T serves as a memory cell which is able to be written and to be read.

The photonic device 230-T may serve as a transistor, as follows. The waveguide 235 serves as the gate input, while the waveguide 240 serves as a source input and the output waveguide 245 serves as a drain. In a first case, optical signal 250 is launched to the saturable absorber 120-5A and saturates it. Once a high intensity optical signal 260 is launched, it is attenuated only slightly, and the input optical signal appears as an output optical signal 260. In a second case, no optical signal 250 is launched in the gate 235, and the saturable absorber 120-5A is unsaturated. Once an optical signal 260 is launched, it is severely attenuated and thus optical signal 265 is low. Thus, a gate signal controls the appearance of the source signal in the drain, as in a transistor.

In both cases, an attenuating element 185, shown in FIG. 4, may be added to any of the input or output waveguides, for intensity tuning or calibration.

Figure 7:
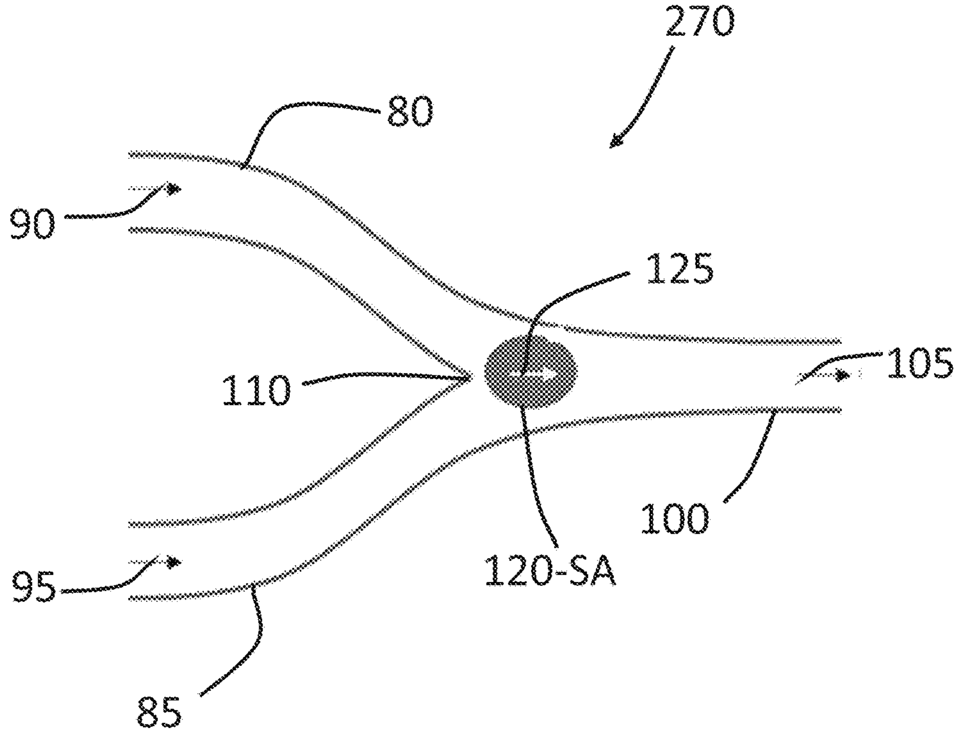
FIG. 7 illustrates a Y-junction device with a saturable absorber for using as an amplifier.

Referring to FIG. 7, a photonic device 270, similar to photonic device 75 of FIG. 3, may serve as an amplifier. Two input waveguides 80 and 85 are connected by a Y-junction 110 to form an output waveguide 100, and a saturable absorber 120-5A is located at the Y-junction 110 or in its vicinity, as outlined above in FIGS. 5-A-F. An attenuating element 185, shown in FIG. 4, may be added to any of the input or output waveguides, for intensity tuning or calibration.

The input waveguide 80 is fed by an optical signal 90 of intensity at the low intensity range 10 (ON state or logical 1). The input waveguide 85 is fed by an optical signal 95 which, in a first case, is at a zero intensity level (OFF state or logical 0), and in a second case is at an intensity level at the low intensity range 10 (ON state or logical 1).

In the first case, the input optical power is almost fully absorbed by saturable absorber 120-5A and no (or a relatively small) output optical signal 105 is emitted.

In the second case of input power from both input waveguides 80 and 85, saturable absorber 120-5A is saturated, and some of the combined input power will reach the output waveguide 100 as an optical signal 105 at an intensity level higher than the intensity level of optical signal 95. Thus, the photonic device 270 serves as an amplifier. Using device 270 before a line split may increase the power at the split, and ensure a logic 1 power level on each line, when necessary. In addition, a series of photonic devices 270 on a degraded signal can restore the signal to its original intensity. As indicated above, input power for amplifying operation of photonic device 270, is provided by input optical signal 90, and photonic device 270 may operate without a need for any additional external optical power, other than input signal propagating through input waveguides 80 and 85.

Figure 8:
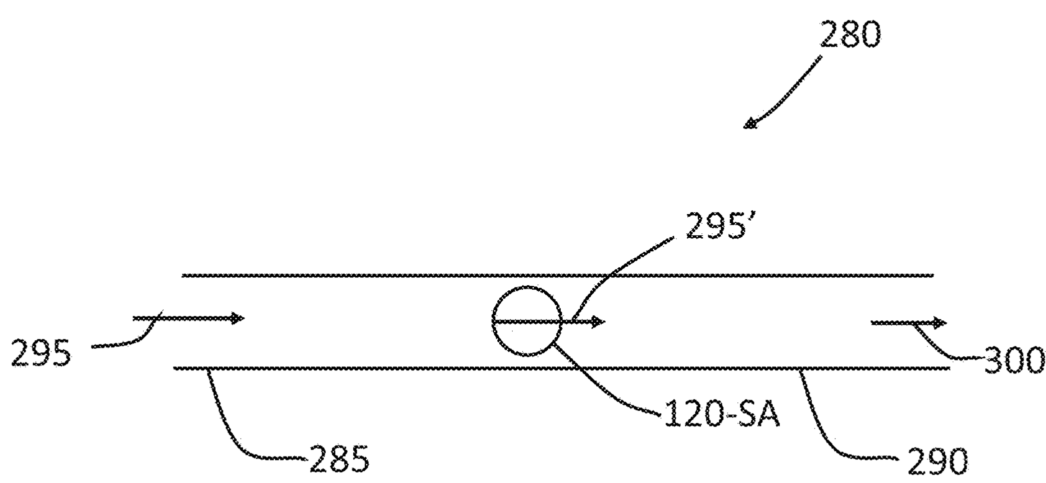
FIG. 8 illustrates a photonic device with a saturable absorber for use as a high-power pass filter.

Referring to FIG. 8, a photonic high power pass filter 280 is presented. It includes an input waveguide 285, an output waveguide 290, and a saturable absorber 120-5A located at the waveguide in between. In case of an input optical signal 295 at low intensity level, at the low intensity range 10, the optical signal 295' propagates through saturable absorber 120-SA and is almost fully absorbed or attenuated, such that merely very low intensity optical signal 300 is emitted. In case of an input optical signal at the high intensity range 20, the saturable absorber 120-SA is saturated and most of the intensity is emitted as output optical signal 300. Thus, photonic device 280 serves as high-power pass filter.

The volume of the special element, saturable absorber 120-SA or reverse saturable absorber 180-RSA, may be between 10 $nm^3$ to 10 $\mu m^3$. It may be made of metals such as Au, Ag, Ti, Cu, Sn, Pt, and Cr, semiconductor materials such as GaAs, AlAs, Ge and InP, a combination of the above, or any other known saturable absorber or reverse saturable absorber, and their combination. In addition, the structure of the special elements may include a single layer, several layers or sections, quantum dots, or doped materials. The special elements may be derived from nature, or may be made of an artificial material of nano or micro scale.

Figure 9:
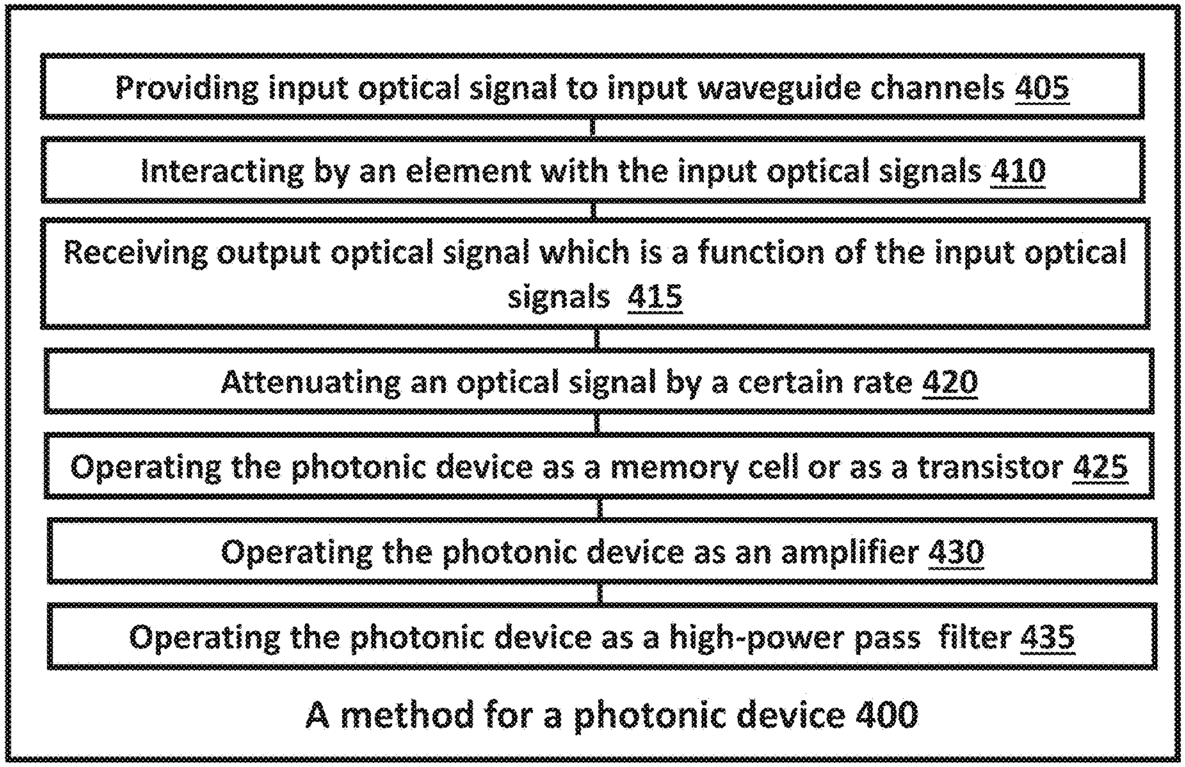
FIG. 9 illustrates a flow chart of a method for operating a photonic device.

A flow chart of a method 400 for operating a photonic device is presented in FIG. 9. The method 400 comprises a step 405 of providing input optical signals 90 and 95 to respective input waveguide channels 80 and 85, a step 410 of interacting by one element, 120-SA or 180-RSA, with the input optical signals 90 and 95 for generating output optical signal 105, and a step 415 of receiving the output optical signal 105 from respective output waveguide 100.

The output optical signals 105 is a selected function of the input optical signals 90 and 95. The one element, 120-SA, interacts with the input optical signals 90 and 95 in accordance with a first attenuation range 15 for optical signals of a low intensity range and with a second attenuation range 25 for optical signals of a high intensity range 20. Total optical intensity impinging the one element is smaller than twenty times maximal intensity of any one of the input optical signals 90 and 95.

Alternatively, the output optical signals 165 is a selected function of the input optical signals 145 and 150. The one element, 180-RSA, interacts with the input optical signals 145 and 150 in accordance with a first attenuation range 35 for optical signals of a low intensity range 30 and with a second attenuation range 45 for optical signals of a high intensity range 40. Total optical intensity impinging reverse saturable absorber 180-RSA is smaller than twenty times maximal intensity of any one of the input optical signals 145 and 150.

In some embodiments, the photonic device 75 comprises several input waveguides 80 and 85, a saturable absorber 120-5A, and one output waveguide 100. The device 75 provides an output optical signal 105 compatible with a logical AND function of the input optical signals 80 and 85. Alternatively, the photonic device comprises two input waveguides 135 and 140, a reverse saturable absorber 180-115A, and one output waveguide 160. The device provides an output optical signal 165 compatible with either a logical OR or a logical XOR function of the input optical signals 145 and 150.

In some embodiments, the photonic device 130 also comprises an attenuating component 185, and the method 400 includes a step 420 of attenuating an optical signal 145 by a certain rate.

In some embodiments, a device 230-T comprises a first input waveguide 235, a second input waveguide 240, an output waveguide 245, and a saturable absorber 120-SA. The first input waveguide 235 guides the respective input optical signal 250 to pump the saturable absorber 120-5A but to substantially refrain from propagating into the output waveguide 245. The method includes a step 425 of providing the first and second input waveguides 235 and 240 with respective first and second input optical signals 250 and 260 for operating the device 230-T as a memory cell or as a transistor, as detailed above.

In some embodiments, a photonic device 270 comprises two input waveguides 80 and 85, a saturable absorber 120-5A, and one output waveguide 100, and the method 400 includes a step 430 of operating the photonic device 270 as an amplifier.

In some embodiments, a photonic device 280 comprises one input waveguide 285, a saturable absorber 120-5A, and one output waveguide 290, and the method 400 includes a step 435 of operating the photonic device 280 as high-power pass filter.

The invention claimed is:

1. A photonic device comprising:

a waveguide structure comprising a junction element having at least two input waveguide channels that converge at the junction element and at least one output waveguide channel extending away from the junction element, each input waveguide channel being configured to guide a respective logical input optical signal toward the junction element;

a nonlinear optical element comprising a saturable absorber positioned at, within, or immediately adjacent to the junction element, the saturable absorber being configured to receive optical energy derived solely from the logical input optical signals propagating in the input waveguide channels as the logical input optical signals converge at the junction element;

wherein the saturable absorber interacts with the logical input optical signals at the junction element to generate, in the output waveguide channel, an output optical signal that is a selected logical function of the logical input optical signals; and wherein total optical intensity impinging on the saturable absorber during operation is derived solely from the logical input optical signals such that the saturable absorber operates without any pump or auxiliary optical beam, and wherein the placement of the saturable absorber at, within, or immediately adjacent to the junction element causes the saturable absorber to interact with the combined field distribution of the logical input optical signals at the junction element.

2. The photonic device of claim 1, wherein the photonic device is adapted to operate utilizing optical power transmitted through said at least two input waveguides and the photonic device is devoid of any waveguide, port, or optical coupling structure configured to introduce a pump or auxiliary optical beam toward the saturable absorber.

3. The photonic device of claim 1, wherein said at least one element is located at a selected distance from a junction between said at least one input waveguide and at least one output waveguide.

4. The photonic device of claim 1, wherein said at least one element is embedded within a waveguide portion of said waveguide structure.

5. The photonic device of claim 1, wherein said at least one element is positioned in external contact with a portion of said waveguide structure.

6. The photonic device of claim 1, wherein said at least one element is positioned in an external location nearby a portion of said waveguide structure.

7. The photonic device of claim 1, wherein the at least two input waveguides unite at a Y-junction.

8. The photonic device of claim 1, wherein said at least one element comprises one or more metals, one or more semiconductors, or a combination thereof.

9. The photonic device of claim 8, wherein said one or more metals is selected from a group of metals consisting of Au, Ag, Ti, Cu, Sn, Pt and Cr, and said one or more semiconductors are selected from a group of semiconductors consisting of GaAs, AlAs, Ge, and InP.

10. The photonic device of claim 1, wherein the device has a first and a second input waveguide and a single output waveguide, and the first input waveguide is configured to guide the respective incoming optical signal to impinge said at least one element, but to substantially refrain from propagating into said single output waveguide.

11. The photonic device of claim 1, wherein a wavelength of the at least one input optical signal is in a certain wavelength band, and no irradiance outside said certain wavelength band of substantial intensity relative to the at least one input optical signal impinges said at least one element.

12. The photonic device of claim 11, wherein the certain wavelength band is 0.55-0.65 μm or 1.2-1.65 μm.

13. The photonic device of claim 1, operable as AND, OR, XOR or NOT logic gate.

14. A method for operating a photonic device comprising a waveguide structure having a junction element with at least two input waveguide channels converging at the junction element, a saturable absorber positioned at, within, or immediately adjacent to the junction element, and no waveguide, port, or optical coupling structure configured to introduce a pump or auxiliary optical beam, the method comprising:

providing respective logical input optical signals to the at least two input waveguide channels such that the logical input optical signals propagate toward and converge at the junction element;

interacting, at the junction element, the saturable absorber interacting with said logical input optical signals for generating at least one output optical signal, said at least one output optical signal being a selected function of said logical input optical signals, wherein said saturable absorber interacts with said logical input optical signals in accordance with a first attenuation rate for optical signals of a first intensity range, and with a second attenuation rate for optical signals of a second intensity range, where the second intensity range is higher than the first intensity range; and total optical intensity impinging on the saturable absorber is derived solely from the logical input optical signals arriving at the junction through the at least two input waveguide channels, such that the saturable absorber operates without any pump or auxiliary optical beam; and receiving said at least one output optical signal from at least one respective output waveguide channel extending away from the junction element.

15. A photonic device comprising:

a waveguide structure comprising a junction element having at least two input waveguide channels that converge at the junction element and at least one output waveguide channel extending away from the junction element, each input waveguide channel guiding a respective logical input optical signal toward the junction element; and a nonlinear optical element comprising a reverse saturable absorber (RSA) positioned at, within or immediately adjacent to the junction element, the RSA being configured to interact with guided-mode optical energy carried by the logical input signal as the logical input optical signals converge at the junction element;

wherein the RSA exhibits increasing attenuation with increasing intensity of the logical input optical signals within a selected operating range; and wherein placement of the RSA at, within, or immediately adjacent to the junction element causes the RSA to interact with a combined modal field distribution of the at least two logical input optical signals at the junction element so as to generate, in the output waveguide channel, an output optical signal that is a selected function of the input optical signals.

16. The photonic device of claim 15, wherein the reverse saturable absorber comprises: one or more metals, one or more semiconductors or a combination thereof.

17. The photonic device of claim 16, wherein the one or more metals are selected from Au, Ag, Ti, Cu, Sn, Pt, and Cr, the one or more semiconductors are selected from GaAs, AlAs, Ge, and InP.

18. The photonic device of claim 15, wherein the input optical signals are in a wavelength band of 0.55-0.65 μm or 1.2-1.65 μm.

19. The photonic device of claim 15, operable as AND, OR, XOR or NOT logic gate.

* * * * *